(12) United States Patent
Byeon

(10) Patent No.: US 10,851,793 B2
(45) Date of Patent: Dec. 1, 2020

(54) FAN MOTOR COMPRISING A HOUSING AND A PRINTED CIRCUIT BOARD DISPOSED OUTSIDE OF A LOWER HOUSING AND COUPLED TO A CONCAVELY FORMED BOARD COUPLING PORTION AT A LOWER SURFACE OF THE HOUSING

(71) Applicant: LG INNOTEK CO., LTD., Seoul (KR)

(72) Inventor: Dae Gil Byeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 178 days.

(21) Appl. No.: 16/070,229

(22) PCT Filed: Jan. 16, 2017

(86) PCT No.: PCT/KR2017/000513
§ 371 (c)(1),
(2) Date: Jul. 13, 2018

(87) PCT Pub. No.: WO2017/123070
PCT Pub. Date: Jul. 20, 2017

(65) Prior Publication Data
US 2019/0048881 A1 Feb. 14, 2019

(30) Foreign Application Priority Data

Jan. 14, 2016 (KR) .................. 10-2016-0004767
Jan. 15, 2016 (KR) .................. 10-2016-0005243

(51) Int. Cl.
*F04D 25/06* (2006.01)
*H02K 7/14* (2006.01)
(Continued)

(52) U.S. Cl.
CPC .......... *F04D 25/068* (2013.01); *F04D 17/16* (2013.01); *F04D 25/0613* (2013.01);
(Continued)

(58) Field of Classification Search
CPC .... F04D 25/0613; F04D 25/068; F04D 17/16; F04D 25/0606; F04D 29/056;
(Continued)

(56) References Cited

U.S. PATENT DOCUMENTS 4,164,690 A * 8/1979 Muller ................ F04D 25/0653
310/63
4,482,302 A * 11/1984 Grignon ................ F04D 29/023
415/220

(Continued)

FOREIGN PATENT DOCUMENTS

CN 201068903 6/2008
CN 202883399 4/2013
(Continued)

OTHER PUBLICATIONS

Chinese Office Action dated Sep. 30, 2019.
(Continued)

*Primary Examiner* — Devon C Kramer
*Assistant Examiner* — Benjamin Doyle
(74) *Attorney, Agent, or Firm* — KED & Associates LLP

(57) ABSTRACT

The present invention provides a fan motor which includes a housing, a stator disposed inside the housing, a rotor disposed inside the stator, a blade coupled to the rotor, and a printed circuit board disposed under the blade, wherein the printed circuit board includes a first mounting portion positioned inside a radius of the blade and a second mounting portion positioned outside the radius of the blade, and in which a component having a large height is mounted on the second mounting portion. Therefore, an advantageous effect that a component having a large height may be mounted within a limited design height.

7 Claims, 16 Drawing Sheets

(51) Int. Cl.
  *H02K 7/08*    (2006.01)
  *F04D 29/42*   (2006.01)
  *H02K 11/38*   (2016.01)
  *H02K 11/215*  (2016.01)
  *F04D 17/16*   (2006.01)
  *F04D 29/056*  (2006.01)
  *F04D 29/58*   (2006.01)

(52) U.S. Cl.
  CPC ....... *F04D 29/056* (2013.01); *F04D 29/4226* (2013.01); *F04D 29/5813* (2013.01); *H02K 7/08* (2013.01); *H02K 7/14* (2013.01); *H02K 11/215* (2016.01); *H02K 11/38* (2016.01); *H02K 2211/03* (2013.01)

(58) Field of Classification Search
  CPC ............ F04D 29/4226; F04D 29/5813; H02K 11/215; H02K 11/38; H02K 7/08; H02K 7/14; H02K 2211/03; H02K 11/21; H02K 11/20–40
  USPC .................................. 417/423.7; 310/DIG. 3
  See application file for complete search history.

(56) References Cited

U.S. PATENT DOCUMENTS

| | | | | |
|---|---|---|---|---|
| 4,818,907 | A * | 4/1989 | Shirotori | G11B 19/2009 310/67 R |
| 4,885,488 | A * | 12/1989 | Cox | F04D 25/0653 310/68 R |
| 5,971,725 | A * | 10/1999 | de Simon | F04D 19/04 417/423.1 |
| 6,050,785 | A * | 4/2000 | Horng | F04D 25/0613 417/354 |
| 6,179,561 | B1 * | 1/2001 | Horng | F04D 25/0653 361/679.48 |
| 6,400,053 | B1 * | 6/2002 | Horng | H02K 1/187 310/67 R |
| 6,509,704 | B1 * | 1/2003 | Brown | H02K 5/225 318/400.08 |
| 6,603,635 | B1 | 8/2003 | Suzuki et al. | |
| 6,916,160 | B2 * | 7/2005 | Obara | F04D 25/08 417/354 |
| 7,548,425 | B2 * | 6/2009 | Hata | G06F 1/203 165/80.4 |
| 7,903,406 | B2 * | 3/2011 | Takemoto | F04D 17/162 361/695 |
| 7,976,293 | B2 * | 7/2011 | Kusano | F01D 1/02 417/423.7 |
| 9,140,263 | B2 * | 9/2015 | Horng | F04D 17/04 |
| 9,846,462 | B2 * | 12/2017 | Chen | G06F 1/203 |
| 10,021,775 | B1 * | 7/2018 | Shen | G06F 1/20 |
| 2005/0106046 | A1 * | 5/2005 | Winkler | H02K 29/08 417/423.3 |
| 2007/0194668 | A1 * | 8/2007 | Teshima | F04D 25/0613 310/67 R |
| 2008/0218011 | A1 * | 9/2008 | Cosco | H02K 29/08 310/71 |
| 2008/0219838 | A1 * | 9/2008 | Kusano | F01D 1/02 415/203 |
| 2010/0213849 | A1 * | 8/2010 | Chien | F21S 9/02 315/86 |
| 2010/0303647 | A1 * | 12/2010 | Ida | F04D 25/0613 417/352 |
| 2011/0142698 | A1 * | 6/2011 | Chang | F04D 25/0613 417/423.7 |
| 2012/0051904 | A1 * | 3/2012 | Hagen | A62B 18/006 415/224 |
| 2012/0119757 | A1 * | 5/2012 | Nakamura | G01R 31/001 324/613 |
| 2014/0168991 | A1 * | 6/2014 | Kim | F21V 15/013 362/297 |
| 2014/0341760 | A1 * | 11/2014 | Chou | F04D 25/0633 417/354 |
| 2015/0289418 | A1 * | 10/2015 | Hansen | H05K 7/209 361/704 |

FOREIGN PATENT DOCUMENTS

| | | | |
|---|---|---|---|
| CN | 103200995 | 7/2013 | |
| CN | 104405669 | 3/2015 | |
| CN | 104883007 | 9/2015 | |
| CN | 105022460 | 11/2015 | |
| CN | 105317711 | 2/2016 | |
| JP | 3055492 | * 7/1998 | ............... H02K 9/00 |
| JP | 10-313565 A | 11/1998 | |
| JP | 11-027917 A | 1/1999 | |
| JP | 3055492 U | 1/1999 | |
| JP | 2003-309959 A | 10/2003 | |
| KR | 10-2004-0095033 A | 11/2004 | |

OTHER PUBLICATIONS

International Search Report (with English Translation) dated Apr. 17, 2017 issued in Application No. PCT/KR2017/000513.
Chinese Office Action dated Jun. 15, 2020 issued in Application 2017800067291.

* cited by examiner

FAN MOTOR COMPRISING A HOUSING AND A PRINTED CIRCUIT BOARD DISPOSED OUTSIDE OF A LOWER HOUSING AND COUPLED TO A CONCAVELY FORMED BOARD COUPLING PORTION AT A LOWER SURFACE OF THE HOUSING

CROSS-REFERENCE TO RELATED PATENT APPLICATIONS

This application is a U.S. National Stage Application under 35 U.S.C. § 71 of PCT Application No. PCT/KR2017/000513, filed Jan. 16, 2017, which claims priority to Korean Patent Application No. 10-2016-0004767, filed Jan. 14, 2016, and Korean Patent Application No. 10-2016-0005243, filed Jan. 15, 2016, whose entire disclosures are hereby incorporated by reference.

TECHNICAL FIELD

The present invention relates to a fan motor.

BACKGROUND ART

A fan motor is a blowing apparatus in which a rotor and a blade are coupled to supply or discharge air. The fan motor includes the rotor, a stator, and the blade, and the stator is installed to be spaced apart from the rotor along a circumference of the rotor. In addition, coils for generating a rotating magnetic field may be wound around the stator, the stator and the rotor may induce an electromagnetic interaction to induce rotation of the rotor. When the rotor rotates, the blade coupled to the rotor rotates.

A printed circuit board is disposed under the blade. Specifically, the printed circuit board may be disposed to be positioned in a blade radius. However, in a case in which components having large heights are mounted on the printed circuit board, there is a problem in that the components may not be mounted because of a structure in which the printed circuit board is positioned under the blade. The reason is that there is a limitation in design height of the fan motor according to a product to which the fan motor is applied.

Meanwhile, a hole, through which a shaft of the rotor and a coupling module of a housing pass, may be formed in the printed circuit board. In a case in which the hole is formed in the printed circuit board, a total area of the printed circuit board decreases. When the area of the printed circuit board decreases, heating efficiency reduces. Therefore, there is a problem in that performance of components mounted on the printed circuit board degrades.

DISCLOSURE

Technical Problem

The present invention is directed to providing a fan motor in which components having large heights may be mounted within a limited design height.

The present invention is also directed to providing a fan motor capable of effectively cooling components mounted on a printed circuit board even when an area of the printed circuit board is small, and a vehicle including the same.

Objectives to be achieved by embodiments of the present invention are not limited to the above-described objectives, and other objectives, which are not described above, may be clearly understood by those skilled in the art through the following specification.

Technical Solution

One aspect of the present invention provides a fan motor including a housing, a stator disposed inside the housing, a rotor disposed inside the stator, a blade coupled to the rotor, and a printed circuit board disposed under the blade, wherein the printed circuit board includes a first mounting portion positioned inside a radius of the blade and a second mounting portion positioned outside the radius of the blade.

A board coupling portion coupled to the first mounting portion may be formed at on outer surface of the housing.

The board coupling portion may include a component hole which communicates with an inside of the housing and into which a component mounted on the first mounting portion is inserted.

The component hole may be disposed between an outer circumferential surface of the blade and an inner circumferential surface thereof.

The component hole may be disposed along a reference line passing through a center between the outer circumferential surface of the blade and the inner circumferential surface thereof.

The housing may include a board cover configured to cover the first mounting portion.

The board cover may include an air circulation hole.

The board cover may include a cable-in hole.

The board cover may include a first coupling portion, and the printed circuit board may include a second coupling portion coupled to the first coupling portion.

Another aspect of the present invention provides a vehicle including a fan motor which has a housing, a stator disposed inside the housing, a rotor disposed inside the stator, a blade coupled to the rotor, and a printed circuit board disposed under the blade, wherein the printed circuit board includes a first mounting portion positioned inside a radius of the blade and a second mounting portion positioned outside the radius of the blade.

Still another aspect of the present invention provides a fan motor including a housing, a stator disposed inside the housing, a rotor disposed inside the stator, a blade coupled to the rotor, and a printed circuit board disposed under the blade, wherein the housing includes a first space portion having the blade and a second space portion divided from the first space portion and including the printed circuit board.

The printed circuit board may include a first mounting portion positioned inside a radius of the blade and a second mounting portion positioned outside the radius of the blade.

The housing may include an upper housing and a lower housing which are coupled to form the first space portion and the second space portion.

The lower housing may include a board coupling portion coupled to the first mounting portion.

The board coupling portion may include a component hole which communicates with the first space portion and into which a component mounted on the first mounting portion is inserted.

The component hole may be disposed between an outer circumferential surface of the blade and an inner circumferential surface thereof.

The component hole may be disposed along a reference line passing through a center between the outer circumferential surface of the blade and the inner circumferential surface thereof.

The upper housing may include a board cover configured to cover the second mounting portion.

The board cover may include an air circulation hole.

The board cover may include a cable-in hole.

The board cover may include a first coupling portion, and the printed circuit board may include a second coupling portion coupled to the first coupling portion.

Yet another aspect of the present invention provides a vehicle including a fan motor which has a housing, a stator disposed inside the housing, a rotor disposed inside the stator, a blade coupled to the rotor, and a printed circuit board disposed under the blade, wherein the housing includes a first space portion having the blade and a second space portion divided from the first space portion and including the printed circuit board.

Yet another aspect of the present invention provides a fan motor including a housing, a stator disposed inside the housing, a rotor disposed inside the stator, a blade coupled to the rotor, and a printed circuit board disposed under the stator, wherein the printed circuit board includes an electrical component arranged on a track having a radius which is greater than an outer diameter of the blade among tracks about a rotating shaft of the blade.

A plurality of electrical components may be arranged on one track.

A blowing port may be disposed at one side of a first reference line which passes through a center of the blade and is formed in parallel to a blowing surface of the blowing port of the housing, and the electrical component may be disposed at the other side of the first reference line.

The electrical component may be disposed at any one side, at which the blowing port is disposed, of a second reference line which passes through the center of the blade and is formed to be perpendicular to the blowing surface of the blowing port of the housing.

The housing may include a first coupling portion, and the printed circuit board may include a second coupling portion coupled to the first coupling portion.

The housing may include a lower housing and an upper housing which are coupled, and the lower housing may include the first coupling portion.

The fan motor may further include a bearing assembly having a bearing configured to rotatably support a rotating shaft of the rotor, and a bearing housing having the bearing and coupled to the lower housing.

A hole through which the bearing housing passes may be provided in the printed circuit board.

Yet another aspect of the present invention provides a vehicle including a fan motor which has a housing, a stator disposed inside the housing, a rotor disposed inside the stator, a blade coupled to the rotor, and a printed circuit board disposed under the stator, wherein the printed circuit board includes an electrical component arranged on a track having a radius which is greater than an outer diameter of the blade among tracks about a rotating shaft of the blade.

Advantageous Effects

According to one embodiment of the present invention, since a printed circuit board includes a first mounting portion positioned inside a radius of a blade and a second mounting portion positioned outside the radius of the blade, and components having large heights are disposed in the second mounting portion, there is an advantageous effect that the components having large heights can be mounted within a limited design height.

According to one embodiment of the present invention, since the printed circuit board is formed such that the components are disposed on a blowing path, there is an advantageous effect in that the components, which are mounted on the printed circuit board in a state in which an area of the printed circuit board decreases, can be effectively cooled.

According to one embodiment of the present invention, since the printed circuit board is formed such that the components are disposed on a track disposed outside a blade on the blowing path, there is an advantageous effect in that the components, which are mounted on the printed circuit board in the state in which the area of the printed circuit board decreases, can be more effectively cooled.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

Figure 1:
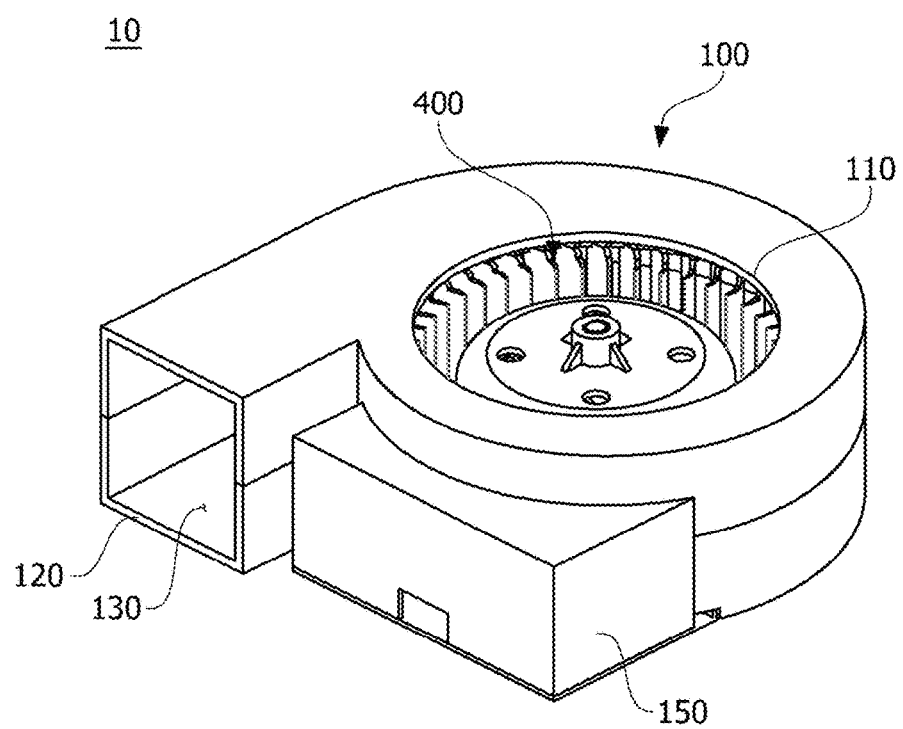
FIG. 1 is a view illustrating a fan motor according to a first embodiment.
Figure 2:
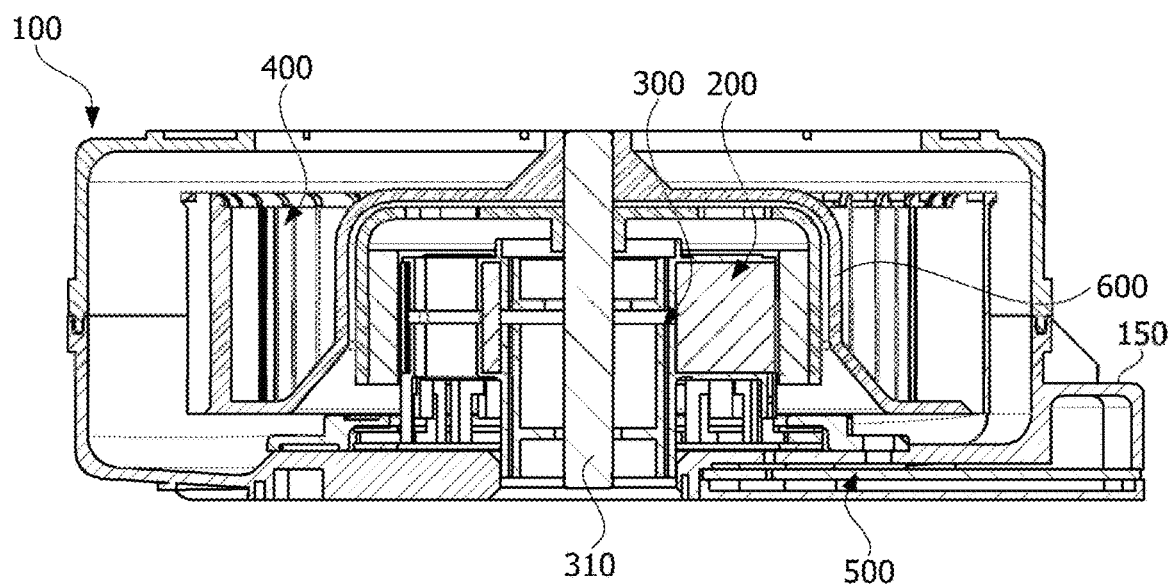
FIG. 2 is a cross-sectional view illustrating the fan motor illustrated in FIG. 1.

FIG. 1 is a view illustrating a fan motor according to a first embodiment, and FIG. 2 is a cross-sectional view illustrating the fan motor illustrated in FIG. 1.

Referring to FIGS. 1 and 2, a fan motor 10 according to the first embodiment may include a housing 100, a stator 200, a rotor 300, a blade 400, and a printed circuit board 500.

The stator 200, the rotor 300, and the blade 400 may be disposed inside the housing 100. The housing 100 may include an intake 110 for drawing in air and a blowing port 120 for discharging the drawn in inhaled air. In addition, the housing 100 may include a blowing path 130 connected to the blowing port 120.

The stator 200 may be disposed inside an inner cover 600. The stator 200 may be formed by stacking a plurality of steel plates including ring-shaped yoke portions and tooth portions disposed in a circumferential direction, protruding outward from the yoke portions in a diameter direction, and spaced an equiangular interval from each other. Coils for generating a rotating electromagnetic field may be wound around the tooth portions.

The rotor 300 is disposed outside the stator 200. A shaft 310 may be coupled to a center of the rotor 300. In addition, the shaft 310 is coupled to the blade 400.

When a current is supplied to the coils wound around the stator 200, a mutual interaction is induced between the stator 200 and the rotor 300, and the rotor 300 is rotated. When the rotor 300 rotates, the shaft 310 rotates to provide power to the blade 400.

Figure 3:
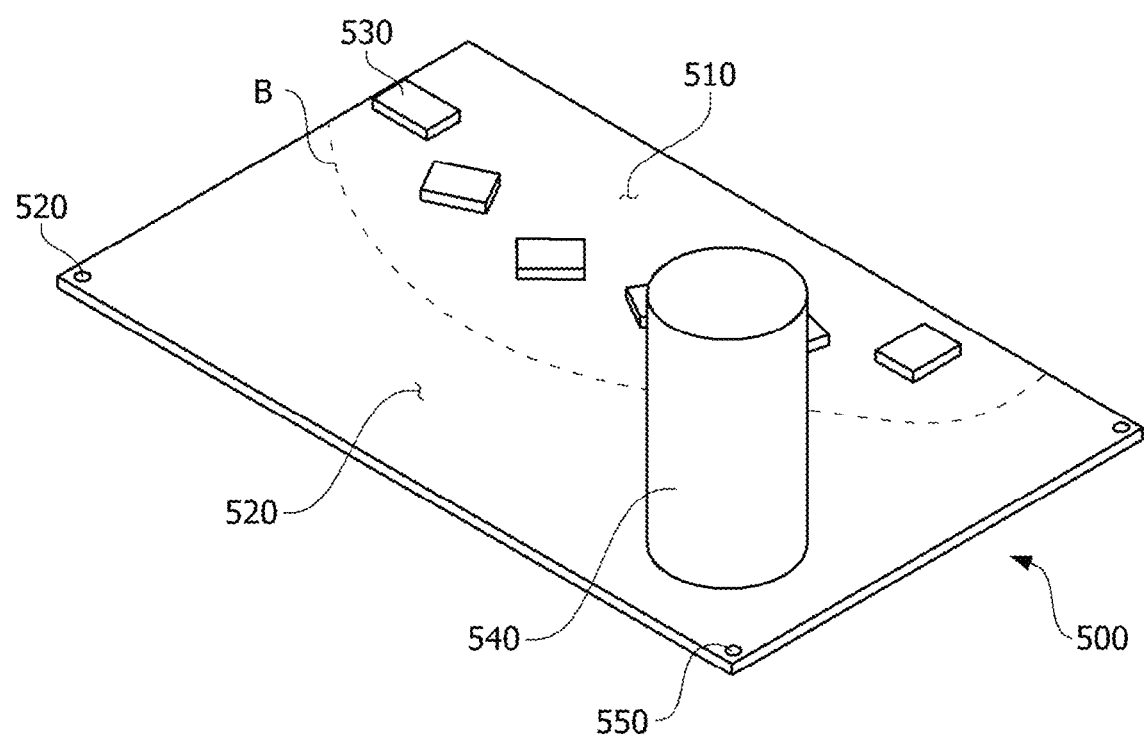
FIG. 3 is a view illustrating a printed circuit board of the fan motor illustrated in FIG. 1.
Figure 4:
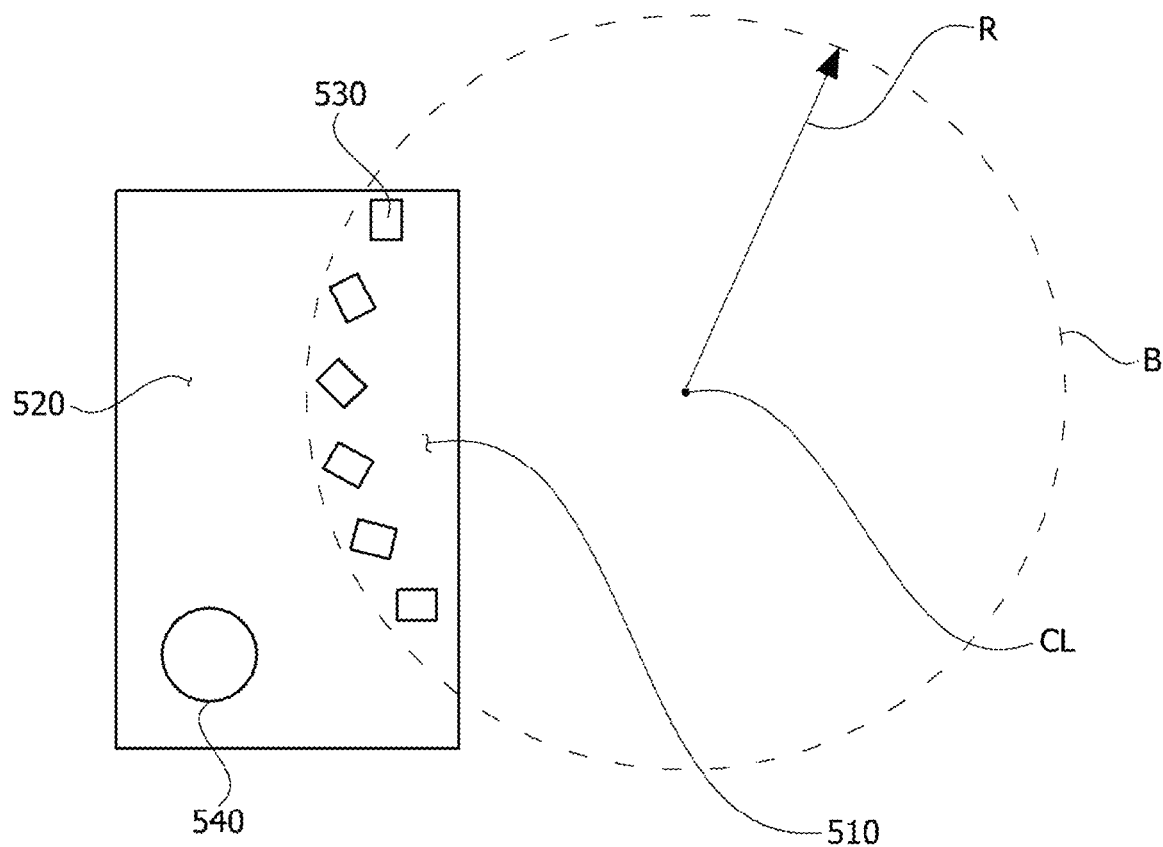
FIG. 4 is a view illustrating a first mounting portion and a second mounting portion of the printed circuit board.

FIG. 3 is a view illustrating a printed circuit board of the fan motor illustrated in FIG. 1, and FIG. 4 is a view illustrating a first mounting portion and a second mounting portion of the printed circuit board.

Referring to FIGS. 3 and 4, the printed circuit board 500 may include a first mounting portion 510 and a second mounting portion 520. The first mounting portion 510 is a portion positioned within a radius R of the blade 400 in a radial direction in the printed circuit board 500. The second mounting portion 520 is a portion disposed outside the radius R of the blade 400 in the radial direction in the printed circuit board 500.

The printed circuit board 500 may be divided into the first mounting portion 510 and the second mounting portion 520 with respect to a virtual circle B defined along an outer circumferential surface of the blade 400.

First components 530 such as a field effect transistor (FET) having a relatively low height may be mounted on the first mounting portion 510. A second component 540 such as an electrolysis capacitor having relatively large heights (for example, 35 mm) may be mounted on the second mounting portion 520. The reason is that there are no limitations in height of the blade 400 when the components are mounted because the second mounting portion 520 is disposed outside the radius R of the blade 400.

Figure 5:
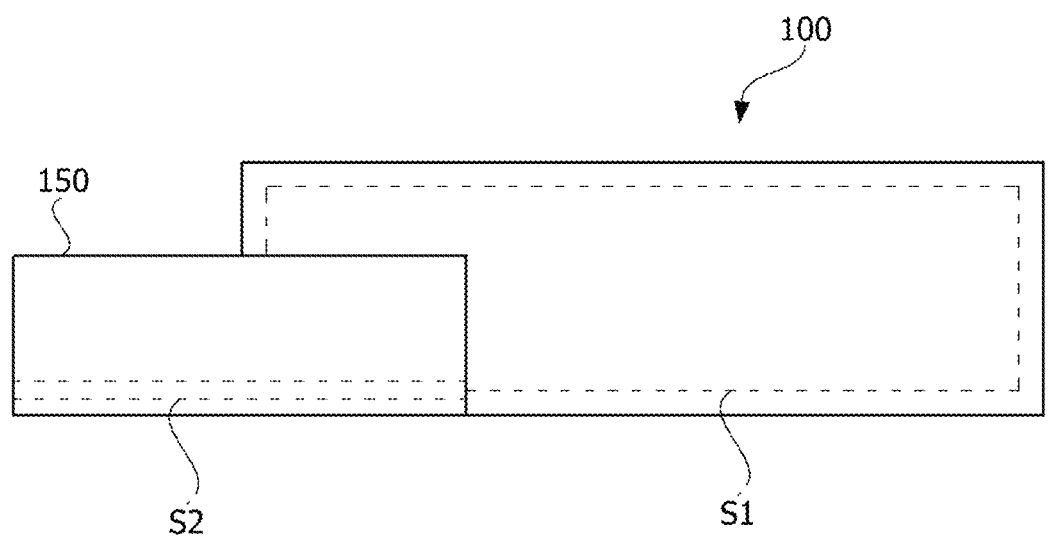
FIG. 5 is a view illustrating a first space portion and a second space portion of a housing of the fan motor illustrated in FIG. 1.
Figure 6:
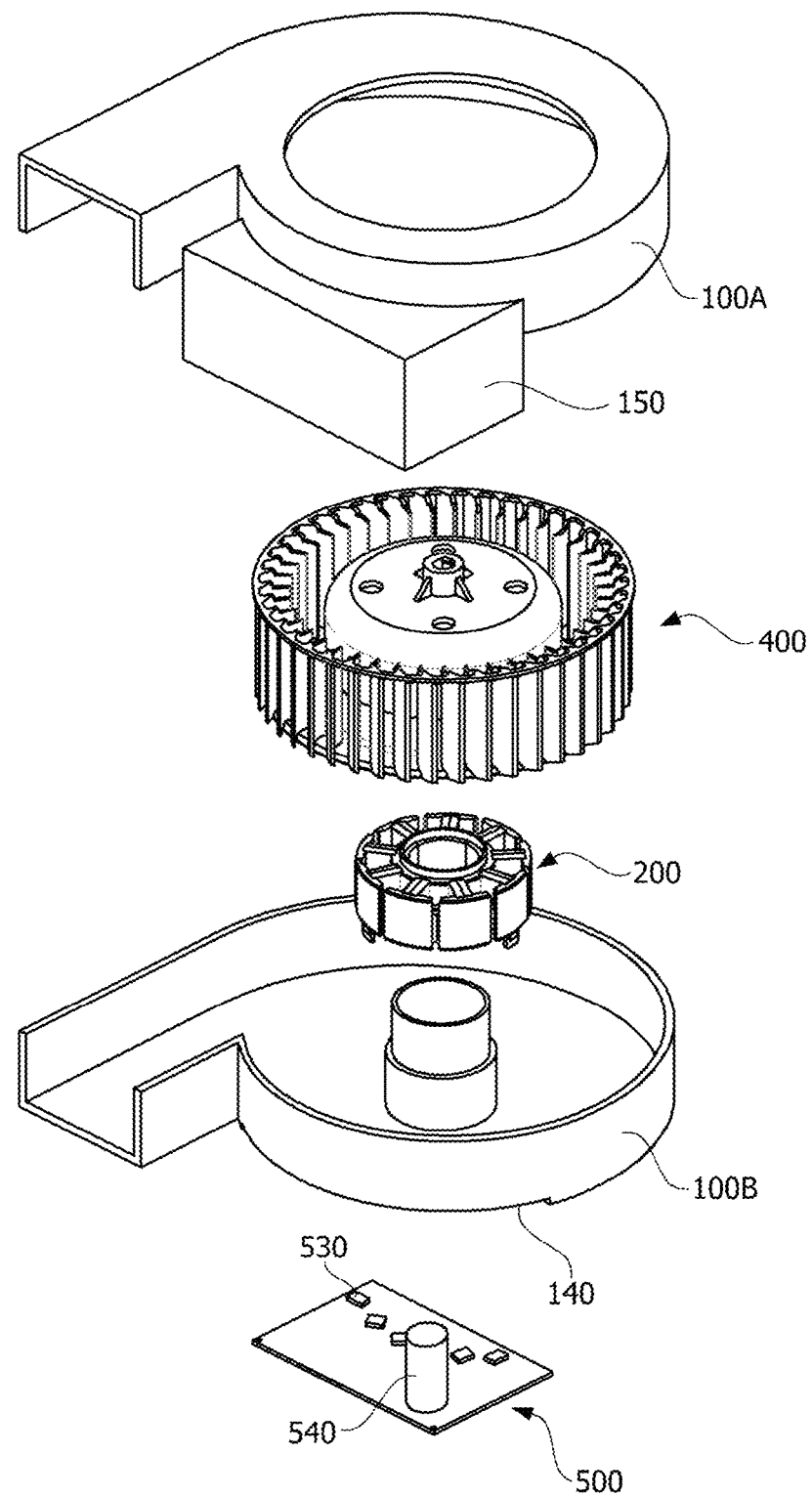
FIG. 6 is an exploded view illustrating the fan motor illustrated in FIG. 1.

FIG. 5 is a view illustrating a first space portion and a second space portion of a housing of the fan motor illustrated in FIG. 1, and FIG. 6 is an exploded view illustrating the fan motor illustrated in FIG. 1.

Referring to FIG. 5, the housing 100 may be divided into a first space portion S1 and a second space portion S2. The blade 400, the stator 200, and the rotor 300 may be disposed in the first space portion S1. In addition, the printed circuit board 500 may be disposed in the second space portion S2.

For example, referring to FIG. 6, the housing 100 may include an upper housing 100A and a lower housing 100B which are coupled. A board cover 150 may be provided on the upper housing 100A. In addition, the lower housing 100B may include a board coupling portion 140. The board cover 150 and the board coupling portion 140 may form the second space portion S2 for accommodating the printed circuit board 500.

Figure 7:
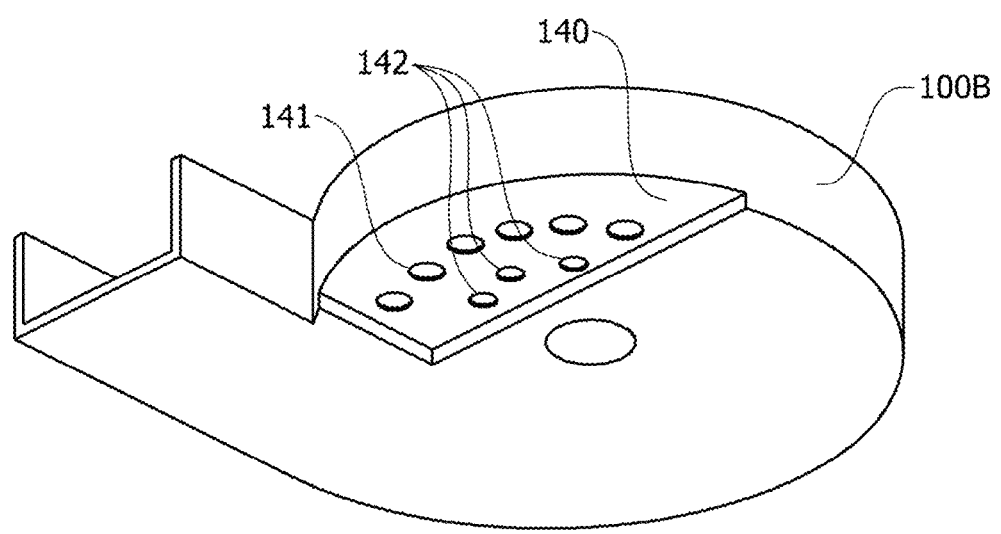
FIG. 7 is a view illustrating a board coupling portion of the housing.

FIG. 7 is a view illustrating a board coupling portion of the housing.

Referring to FIG. 7, the board coupling portion 140 may be concavely formed in a lower surface of the lower housing 100B. The board coupling portion 140 and the first mounting portion 510 (see FIG. 4) of the printed circuit board 500 may be coupled. Meanwhile, component holes 141 may be formed in the board coupling portions 140. The first components 530 such as an FET mounted on the first mounting portion 510 may be inserted into the component holes 141. The component holes 141 may be provided at a position, which corresponds to a position of the first components 530, in the board coupling portion 140

The first components 530 inserted into the component holes 141 are exposed to the first space portion S1 of the housing 100. Here, the first components 530 are disposed just under the blade 400. Accordingly, cooling efficiency of the first components 530 may increase due to air blown by the blade 400. In a case in which the first component 530 is an FET, heat radiation may be high. In this case, a structure in which the board coupling portion 140 includes the component holes 141 may additionally cool the FET to increase total cooling efficiency of the fan motor.

Meanwhile, connecters of U-, V-, and W-phases connected to the coils of the stator 200 and connecting holes 142 for connecting the connector and the printed circuit board 500 may be formed in the board coupling portion 140.

Figure 8:
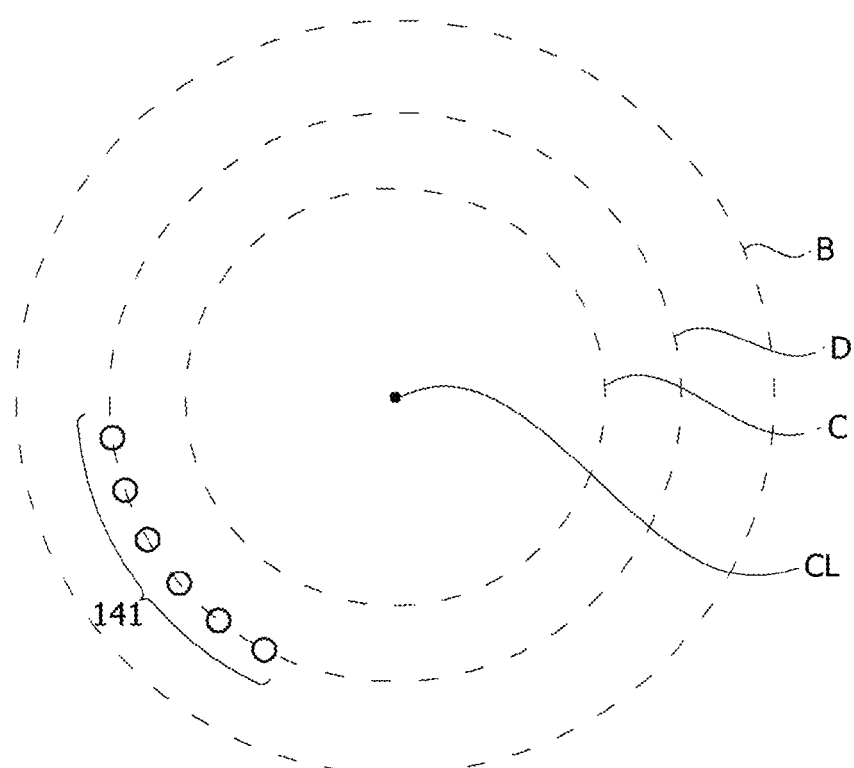
FIG. 8 is a view illustrating a position of component holes of the board coupling portion.

FIG. 8 is a view illustrating a position of component holes of the board coupling portion.

When the board coupling portion 140 and the first mounting portion 510 (see FIG. 3) are coupled, the component holes 141 may be disposed between the outer circumferential surface and an inner circumferential surface of the blade 400, That is, as illustrated in FIG. 8, the component holes 141 may be disposed between the virtual circle B defined along the outer circumferential surface of the blade 400 and a virtual circle C defined along the inner circumferential surface of the blade 400.

Specifically, the component holes 141 may be disposed along a reference line D passing through a center between the outer circumferential surface and the inner circumferential surface of the blade 400.

Figure 9:
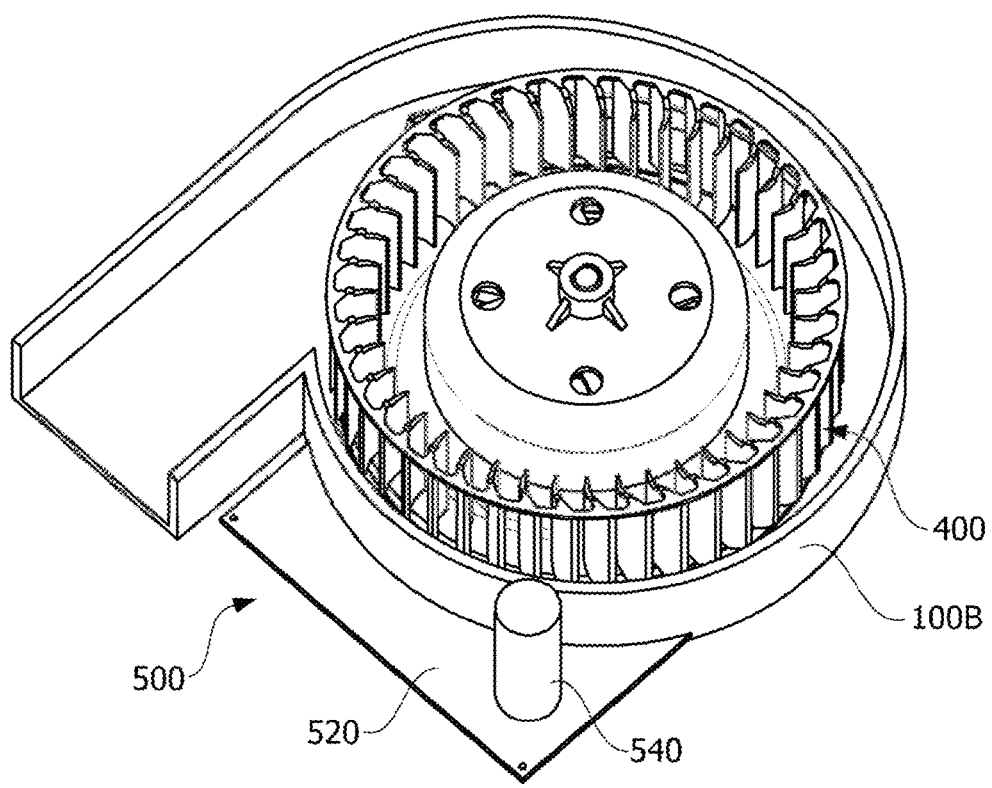
FIG. 9 is a view illustrating the fan motor in a state in which an upper housing is opened.

FIG. 9 is a view illustrating the fan motor in a state in which an upper housing is opened.

Referring to FIG. 9, when the board coupling portion 140 (see FIG. 7) and the printed circuit board 500 are coupled, the second mounting portion 520 of the printed circuit board 500 is exposed to an outside of the lower housing 100B. Accordingly, the second component 540 having a relatively large height may be mounted on the printed circuit board 500. In addition, due to the second mounting portion 520 extending outward from the lower housing 100B, there is also an advantage in designing in consideration of heating and electromagnetic compatibility (EMC)/electromagnetic interference (EMI).

Meanwhile, in the state in which the board coupling portion 140 and the printed circuit board 500 are coupled, a cover for covering the board coupling portion 140 may be coupled to the lower surface of the lower housing 100B (see FIG. 6).

Figure 10:
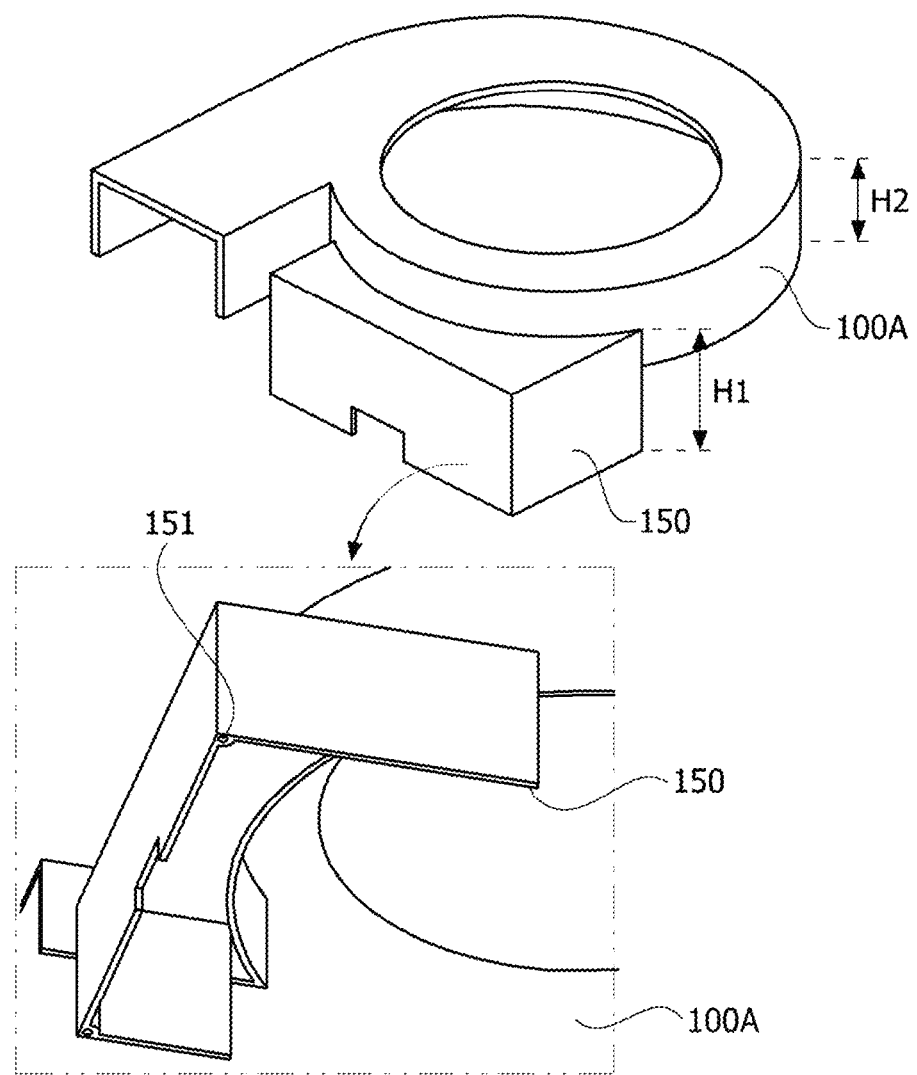
FIG. 10 is a view illustrating a board cover of the housing.

FIG. 10 is a view illustrating a board cover of the housing.

Referring to FIG. 10, the board cover 150 is formed to extend from the upper housing 100A, and serves to cover the second mounting portion 520 (see FIG. 9) of the printed circuit board 500 coupled to the board coupling portion 140 (see FIG. 7). The board cover 150 may be formed to extend downward to have a suitable height so as to cover the second mounting portion 520 (see FIG. 9) disposed near the lower surface of the lower housing 100B, and so as to be coupled to the printed circuit board 500. For example, a height H1 of the board cover 150 may be greater than a height H2 of the upper housing 100A.

Meanwhile, a first coupling portion 151 for physically being coupled to the printed circuit board 500 may also be provided in the board cover 150. The first coupling portion 151 may be coupled to a second coupling portion 550 (see FIG. 3) formed in the printed circuit board 500.

Figure 11:
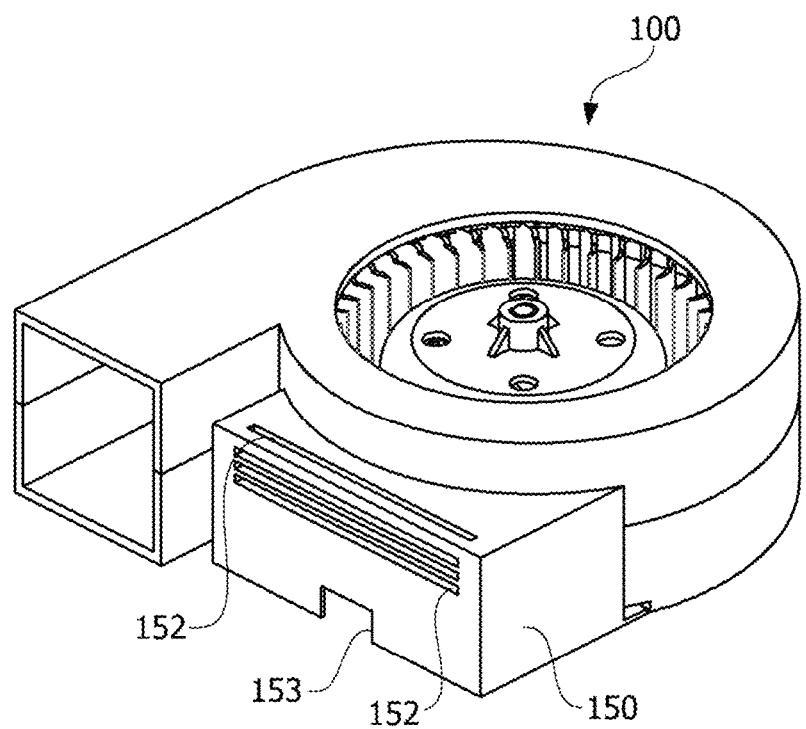
FIG. 11 is a view illustrating an air circulation hole and a cable-in hole of the board cover.

FIG. 11 is a view illustrating an air circulation hole and a cable-in hole of the board cover.

Referring to FIG. 11, the board cover 150 may include air circulation holes 152 and a cable-in hole 153. The air circulation holes 152 serve to allow an inside of the board cover 150 to communicate with an outside thereof and circulate internal air having a temperature increased due to heating of the printed circuit board 500 to the outside. Slots having a long hole shape may be formed as the air circulation holes 152 at upper and side surfaces of the board cover 150. Since the cable-in hole 153 is formed by cutting a part of the side surface of the board cover 150, a cable connected to the printed circuit board 500 may enter through the board cover 150. The cable-in hole 143 may allow the cable to be connected to the printed circuit board 500 inside the board cover 150 from the outside after the printed circuit board 500 (see FIG. 6) is accommodated in the board cover 150.

Accordingly, there is an advantage in that an operation, in which the cable is easily connected to the printed circuit board 500 even after the printed circuit board 500 is assembled at the board coupling portion 140, is easily performed.

Figure 12:
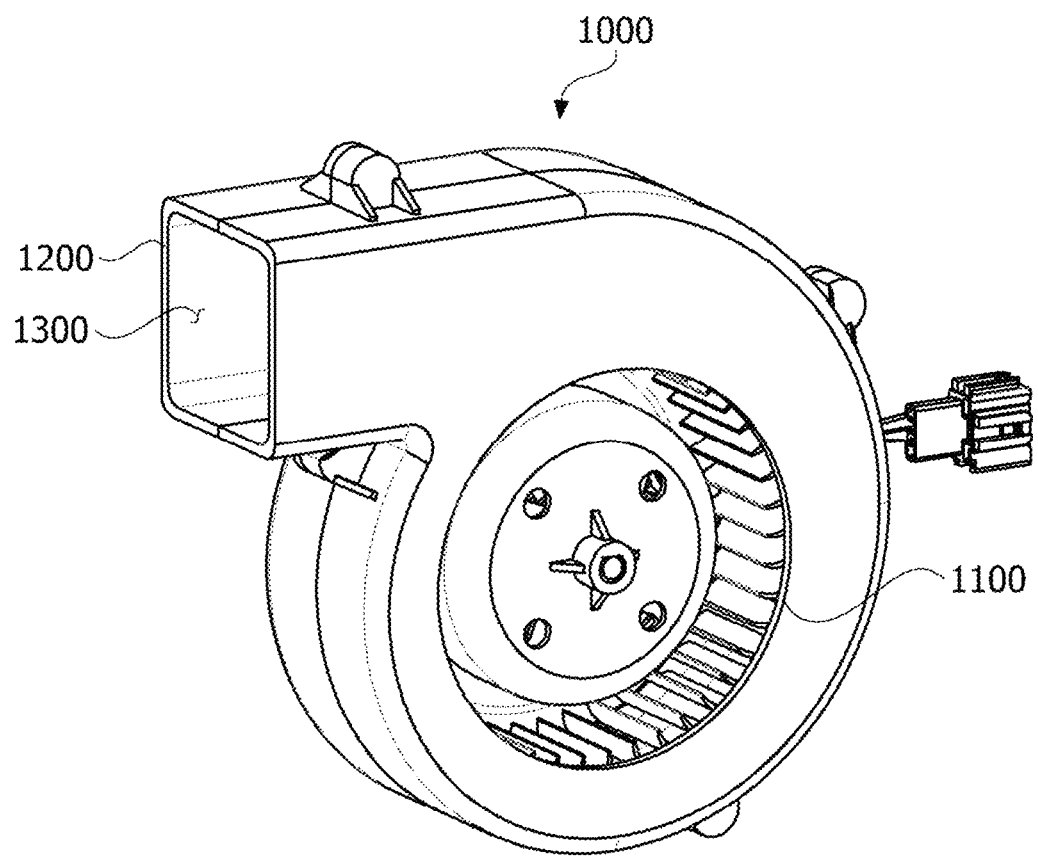
FIG. 12 is a view illustrating a fan motor according to a second embodiment.
Figure 13:
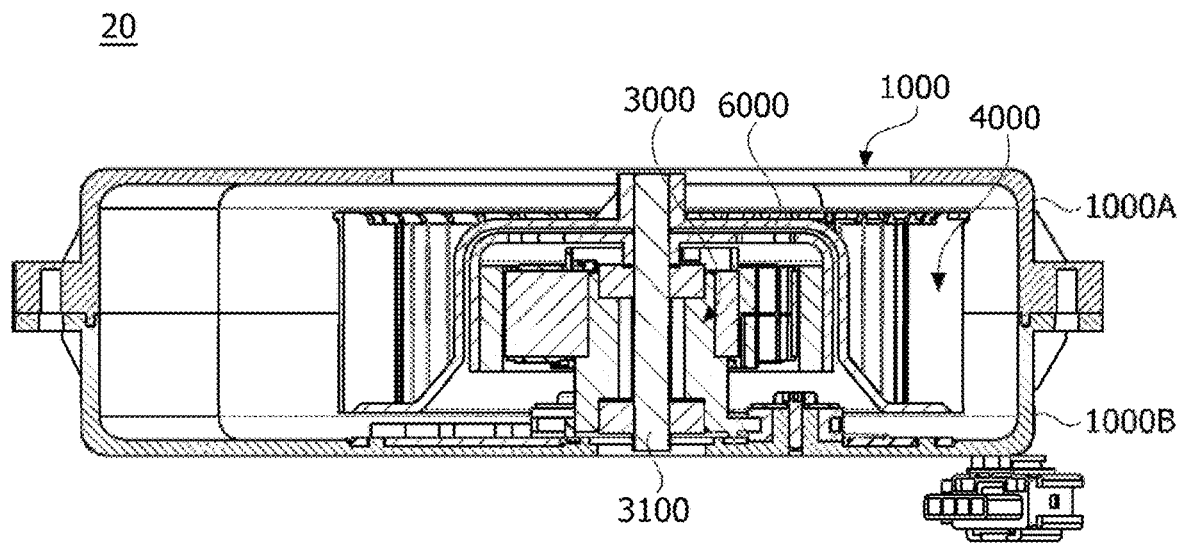
FIG. 13 is a cross-sectional view illustrating the fan motor illustrated in FIG. 12.

FIG. 12 is a view illustrating a fan motor according to a second embodiment, and FIG. 13 is a cross-sectional view illustrating the fan motor illustrated in FIG. 12.

Referring to FIGS. 12 and 13, a fan motor 20 according to the embodiment may include a housing 1000, a stator 2000, a rotor 3000, a blade 4000, and a printed circuit board 5000.

The stator 2000, the rotor 3000, and the blade 4000 may be disposed inside the housing 1000. The housing 1000 may include an intake 1100 for drawing in air and a blowing port 1200 for discharging the drawn in air. In addition, the housing 1000 may include a blowing path 1300 connected to the blowing port 1200. Meanwhile, the housing 1000 may include an upper housing 1000A and a lower housing 1000B which are coupled.

The stator 2000 may be disposed inside an inner cover 6000. The stator 2000 may be formed by stacking a plurality of steel plates including ring-shaped yoke portions and tooth portions disposed in a circumferential direction, protruding outward from the yoke portions in a diameter direction, and spaced an equiangular interval from each other. Coils for generating a rotating electromagnetic field may be wound around the tooth portions.

The rotor 3000 is disposed outside the stator 2000. A shaft 3100 may be coupled to a center of the rotor 3000. In addition, the shaft 3100 is coupled to the blade 4000.

When a current is supplied to the coils wound around the stator 2000, a mutual interaction is induced between the stator 2000 and the rotor 3000, and the rotor 3000 is rotated. When the rotor 3000 rotates, the shaft 3100 rotates to provide power to the blade 4000.

Figure 14:
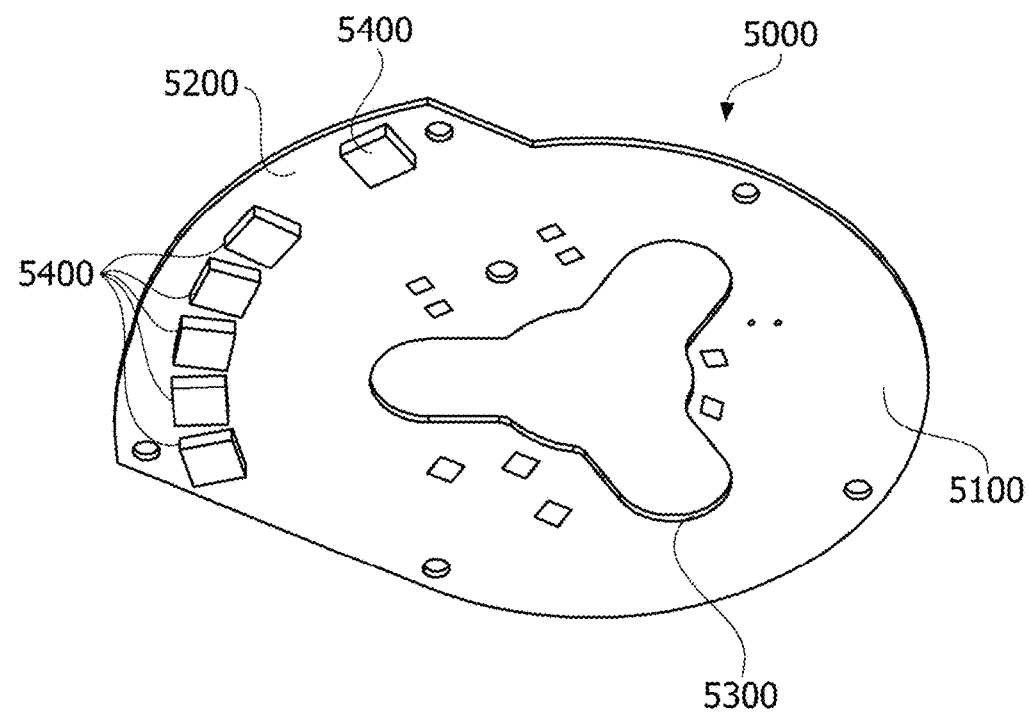
FIG. 14 is a view illustrating a printed circuit board of the fan motor illustrated in FIG. 12.
Figure 15:
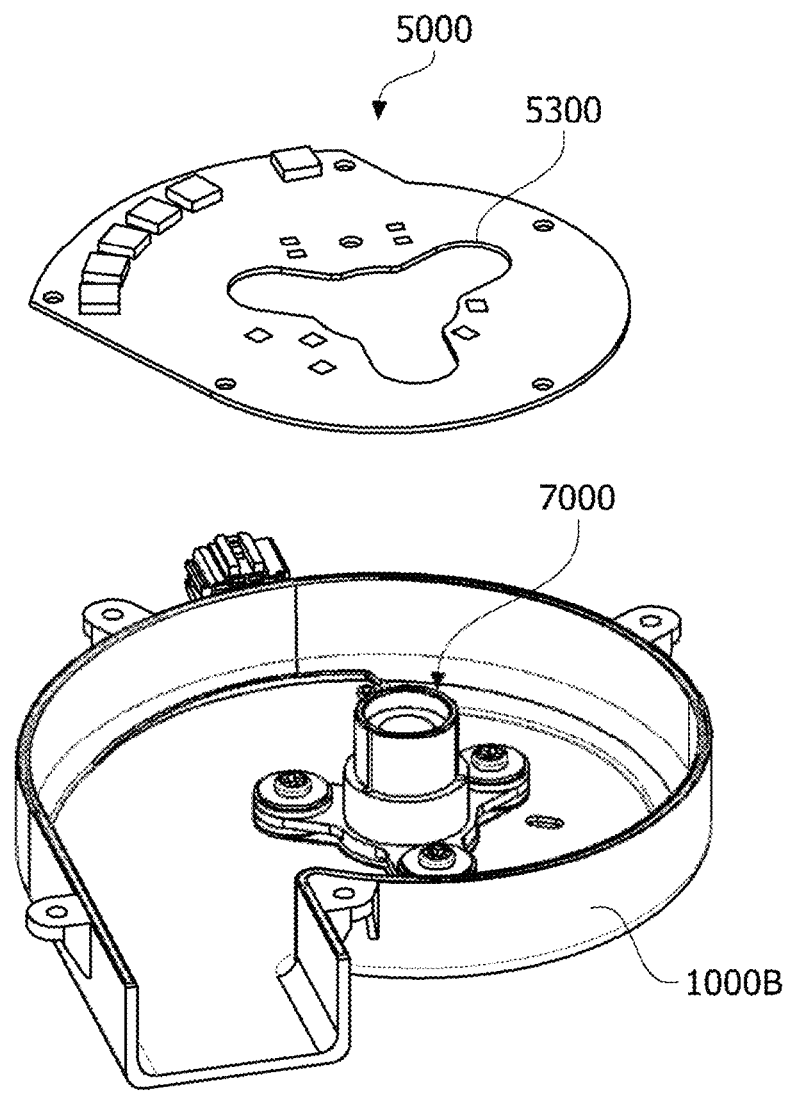
FIG. 15 is a view illustrating the printed circuit board coupled to a housing.

FIG. 14 is a view illustrating a printed circuit board of the fan motor illustrated in FIG. 12, and FIG. 15 is a view illustrating the printed circuit board coupled to a housing.

Referring to FIGS. 14 and 15, the printed circuit board 5000 may be divided into a first region 5100 and a second region 5200.

When the printed circuit board 5000 is disposed under the blade 4000, the first region 5100 is a portion positioned within a radius R of the blade 4000, and the second region 5200 is a portion disposed outside the radius R of the blade 4000.

A hole 5300 may be formed at a center of the first region 5100. The hole 5300 is a portion through which a bearing assembly 7000 for rotatably supporting the shaft 3100 passes. Due to the hole 5300, a total area of the printed circuit board 5000 decreases. The embodiment provides a second region 5200 to compensate for the decreased area. In addition, electrical components 5400 such as an FET which is highly heated may be mounted on the second region 5200.

As illustrated in FIG. 15, in a case in which the printed circuit board 5000 and the lower housing 1000B are coupled, the second region 5200 is disposed outside the blade 4000.

Figure 16:
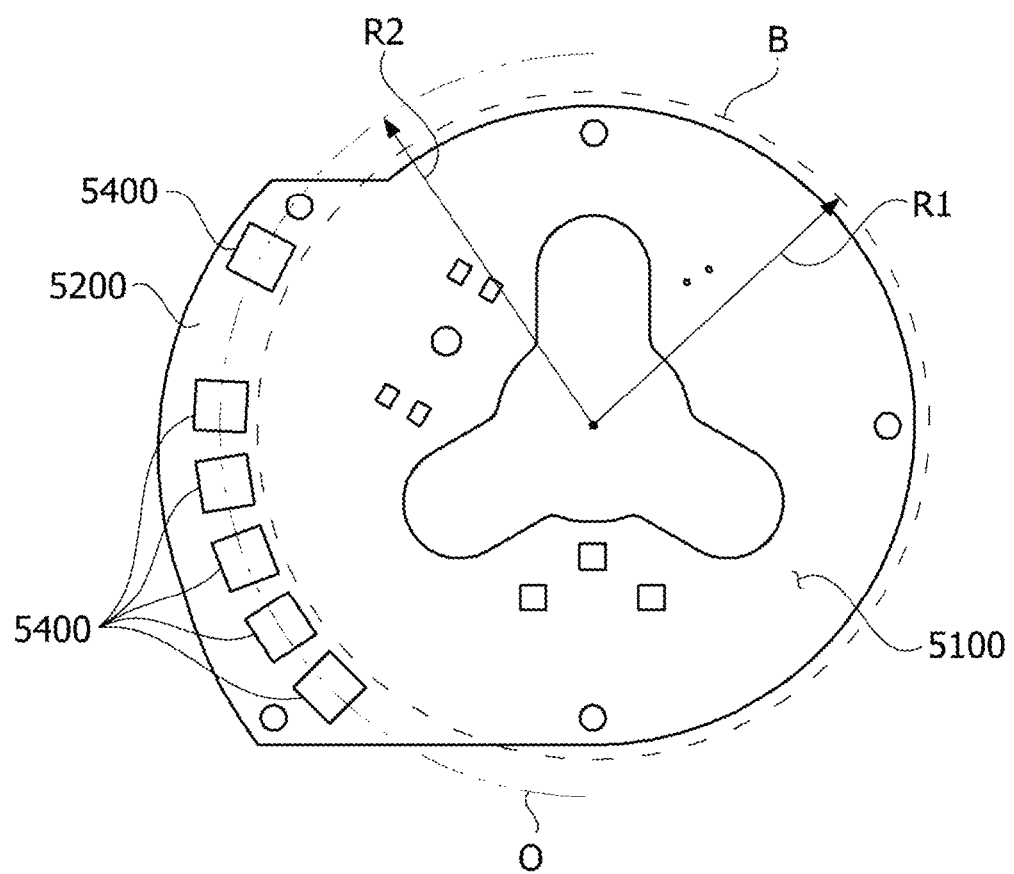
FIG. 16 is a view illustrating a position of electrical components.

FIG. 16 is a view illustrating a position of electrical components.

Referring to FIG. 16, the electrical components 5400 may be disposed outside a virtual circle B defined along an outer circumferential surface of the blade 4000. Specifically, the electrical components 5400 may be arranged on a track O having a radius R2 which is greater than an outer diameter R1 of the blade among tracks about a rotating shaft CL of the blade 4000. In addition, the electrical components 5400 may be disposed along at least any one track O. In addition, the electrical components 5400 may be disposed along a track closest to the blade 4000 within a range in which the electrical components 5400 are disposed outside the blade 4000. This is to minimize noise generated due to friction between air passing through the blowing path 1300 and the electrical components 5400.

Figure 17:
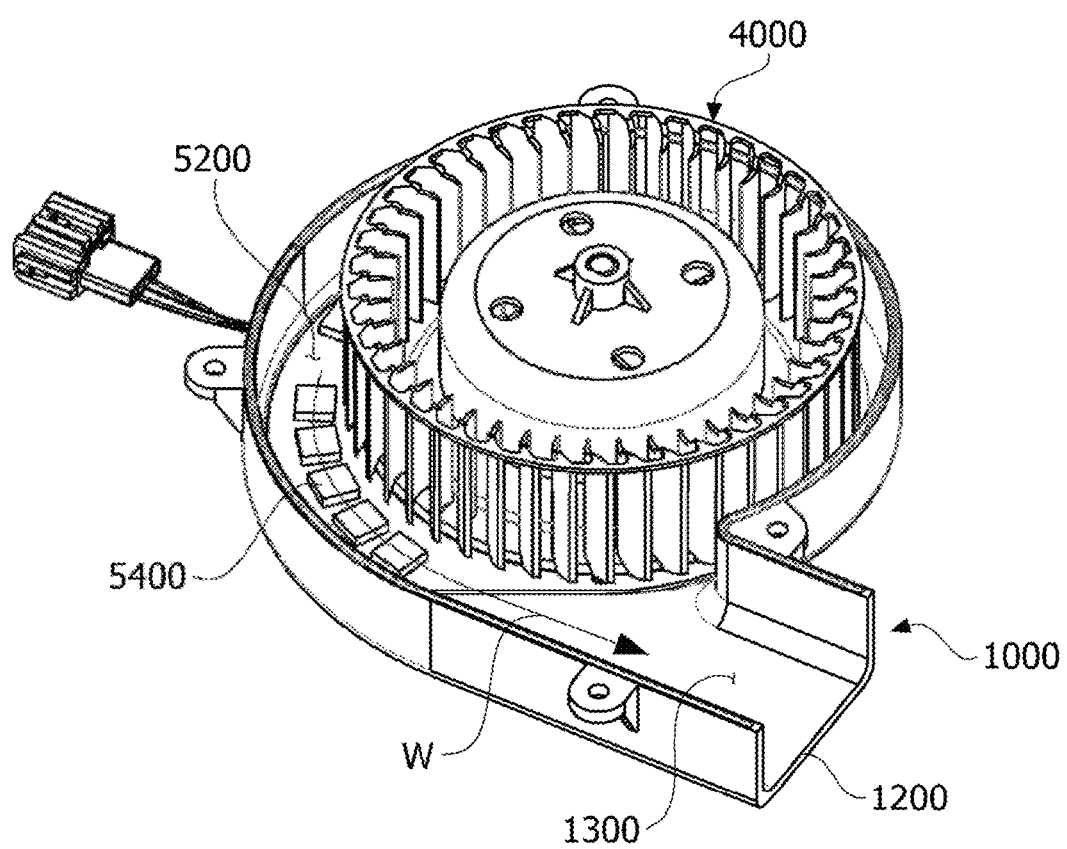
FIG. 17 is a view illustrating the electrical components cooled by blowing.

FIG. 17 is a view illustrating the electrical components cooled by blowing.

Referring to FIG. 17, when air W blown by the blade 4000 flows toward the blowing port 1200, the air W passes by the electrical components 5400 disposed on the blowing path 1300. The blown air W cools the electrical components 5400 while passing by the electrical components 5400. In addition, the blown air W cools the second region 5200 of the printed circuit board 5000 by absorbing heat generated by the second region 5200.

Figure 18:
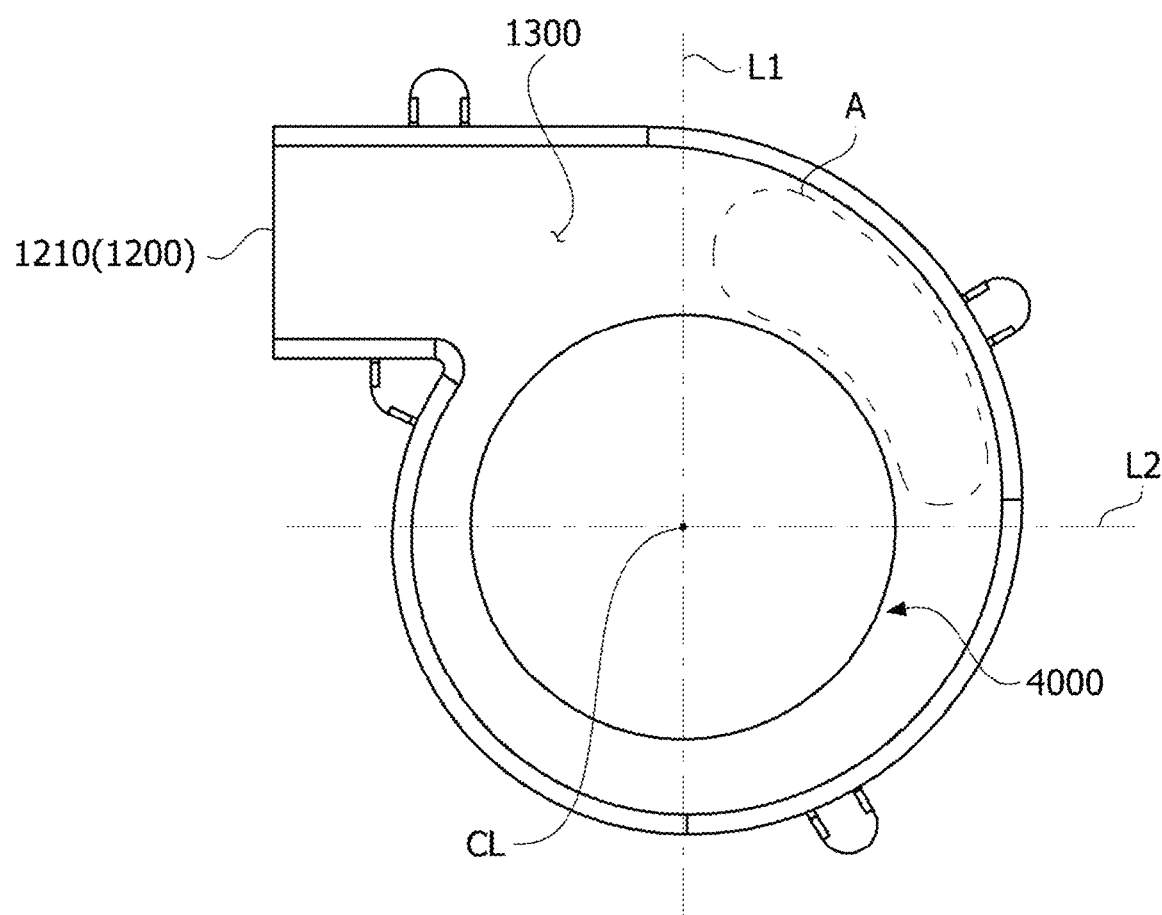
FIG. 18 is a view illustrating the position of the electrical components corresponding to a position of a blade and a position of a blowing port.

FIG. 18 is a view illustrating the position of the electrical components corresponding to a position of a blade and a position of a blowing port.

Referring to FIG. 18, a position A of the electrical components 5400 in consideration of the blade 4000 and the blowing port 1200 may be disposed at an upper right portion of the blade 4000.

Specifically, in a case in which the blowing port 1200 is disposed at one side of a first reference line L1, the position A of the electrical components 5400 may be provided at the other side of the first reference line L1. Here, the blowing port 1200 and the position A of the electrical components 5400 may be provided at one side of the second reference line L2.

Here, the first reference line L1 refers to a virtual reference line which passes through a center CL of the blade 4000 and is formed in parallel to a blowing surface 1210 of the blowing port 1200 of the housing 1000, and the second reference line L2 refers to a virtual reference line which passes through the center CL of the blade 4000 and is formed to be perpendicular to the blowing surface 1210 of the blowing port 1200 of the housing 1000.

Figure 19:
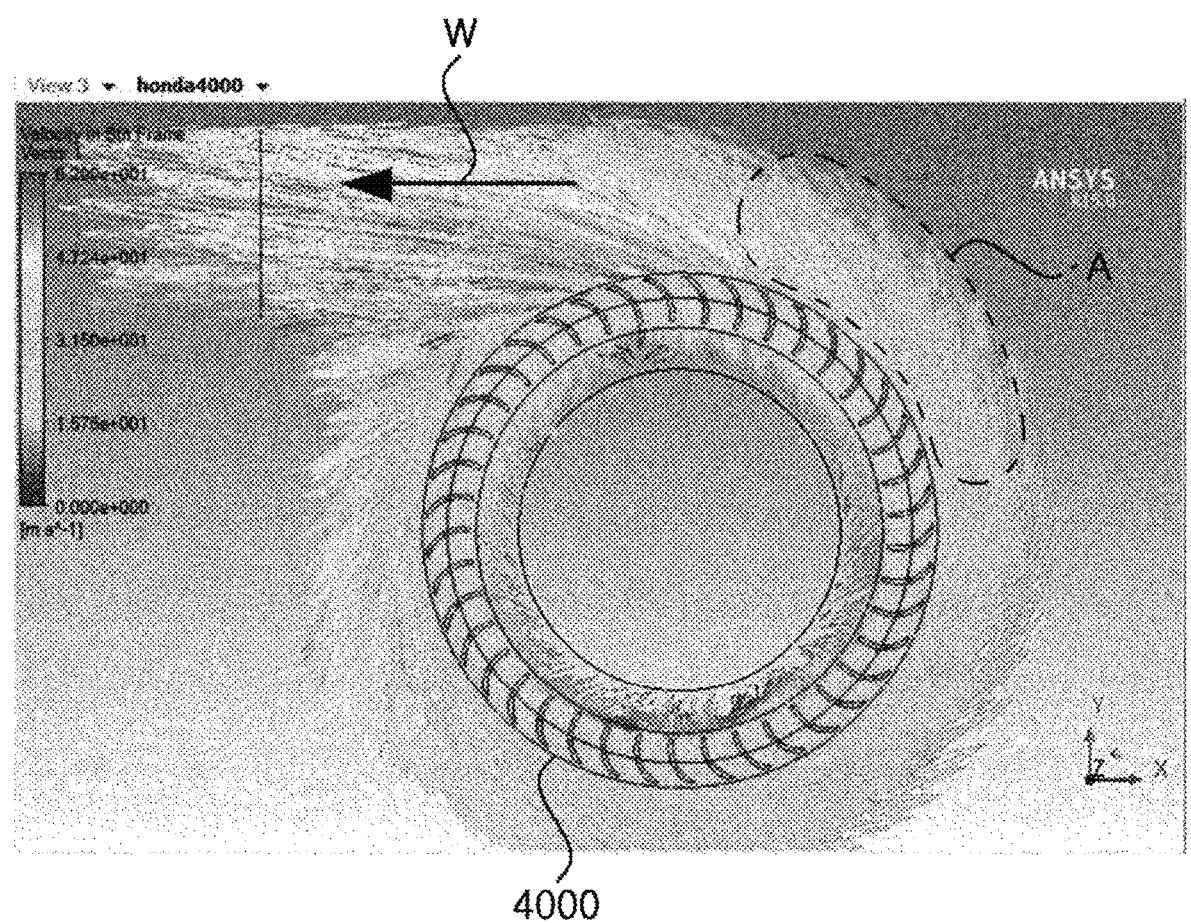
FIG. 19 is a view illustrating the position of the electrical components corresponding to air stream velocity due to the blade.

FIG. 19 is a view illustrating the position of the electrical components corresponding to air stream velocity due to the blade.

Referring to FIG. 19, the position A of the electrical components 5400 corresponding to an air stream velocity due to the blade will be described below. Since an upper right portion of the blade 4000 corresponds to a region in which a stream velocity is low, and the position A of the electrical components 5400 is provided at the region, cooling performance of the electrical components 5400 may be secured while wind-tunnel noise is minimized.

As described above, the fan motor according to one exemplary embodiment of the present invention has been specifically described with reference to the accompanying drawings.

The above description is only an example describing a technological scope of the present invention. Various changes, modifications, and replacements may be made without departing from the spirit and scope of the present invention by those skilled in the art. Therefore, the embodiments disclosed above and in the accompanying drawings should be considered in a descriptive sense only and not for limiting the technological scope. The technological scope of the present invention is not limited by these embodiments and the accompanying drawings. The spirit and scope of the present invention should be interpreted by the appended claims and encompass all equivalents falling within the scope of the appended claims.

REFERENCE NUMERALS

10: FAN MOTOR
100: HOUSING
110: INTAKE
120: BLOWING PORT
130: BLOWING PATH
140: BOARD COUPLING PORTION
141: COMPONENT HOLE
150: BOARD COVER
152: AIR CIRCULATION HOLE
153: CABLE-IN HOLE
200: STATOR
300: ROTOR
310: SHAFT
400: BLADE
500: PRINTED CIRCUIT BOARD
510: FIRST MOUNTING PORTION
520: SECOND MOUNTING PORTION
530: FIRST COMPONENT
540: SECOND COMPONENT
1000: HOUSING
1000A: UPPER HOUSING
1000B: LOWER HOUSING
1100: INTAKE
1200: BLOWING PORT
1210: BLOWING SURFACE
1300: BLOWING PATH
2000: STATOR
3000: ROTOR
3100: SHAFT
4000: BLADE
5000: PRINTED CIRCUIT BOARD
5100: FIRST REGION
5200: SECOND REGION
5300: HOLE
5400: ELECTRICAL COMPONENT

The invention claimed is:

1. A fan motor comprising:
a housing;
a stator disposed inside the housing;
a rotor disposed inside the stator;
a blade coupled to the rotor; and
a printed circuit board disposed under the blade, wherein the printed circuit board includes:
  a first mounting portion positioned inside a radius of the blade, and
  a second mounting portion positioned outside the radius of the blade,
wherein the housing includes an upper housing and a lower housing,
wherein the stator, the rotor, and the blade are disposed inside the upper housing and the lower housing,
wherein the printed circuit board is disposed outside the lower housing,
wherein a board coupling portion to which the printed circuit board is coupled is concavely formed at a lower outer surface of the lower housing, and the first mounting portion of the printed circuit board is coupled to the board coupling portion,
wherein the second mounting portion of the printed circuit board is exposed to the outside of the lower housing, and
wherein the upper housing including a board cover to cover the second mounting portion of the exposed area of the printed circuit board,
wherein the printed circuit board includes a bottom surface that is exposed to outside of the fan motor.

2. The fan motor of claim 1, wherein the board coupling portion includes a component hole into which a component mounted on the first mounting portion is inserted, and wherein the component hole communicates with an inner space between the upper housing and the lower housing.

3. The fan motor of claim 2, wherein the component hole is disposed between an outer circumferential surface of the blade and an inner circumferential surface thereof.

4. The fan motor of claim 3, wherein the component hole is disposed along a reference line passing through a center between the outer circumferential surface of the blade and the inner circumferential surface thereof.

5. The fan motor of claim 1, wherein the board cover includes an air circulation hole.

6. The fan motor of claim 1, wherein the board cover includes a cable-in hole.

7. The fan motor of claim 1, wherein:
the board cover includes a first coupling portion; and
the printed circuit board includes a second coupling portion coupled to the first coupling portion.

* * * * *